(12) United States Patent
Molnar et al.

(10) Patent No.: US 9,961,674 B2
(45) Date of Patent: *May 1, 2018

(54) INTERFERENCE RANDOMIZATION OF CONTROL CHANNEL ELEMENTS

(71) Applicant: Telefonaktiebolaget LM Ericsson (publ), Stockholm (SE)

(72) Inventors: Karl J. Molnar, Cary, NC (US); Jung-Fu Cheng, Fremont, CA (US); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

This patent is subject to a terminal disclaimer.

(21) Appl. No.: 15/204,339

(22) Filed: Jul. 7, 2016

(65) Prior Publication Data

US 2016/0323864 A1 Nov. 3, 2016

Related U.S. Application Data

(63) Continuation of application No. 14/734,518, filed on Jun. 9, 2015, now Pat. No. 9,397,874, which is a
(Continued)

(51) Int. Cl.
*H04W 72/04* (2009.01)
*H04J 11/00* (2006.01)
(Continued)

(52) U.S. Cl.
CPC ..... *H04W 72/0406* (2013.01); *H04J 11/0069* (2013.01); *H04L 1/0071* (2013.01);
(Continued)

(58) Field of Classification Search
CPC ............ H04W 72/0406; H04W 72/042; H04J 11/0069; H04L 1/0071; H04L 1/0072;
(Continued)

(56) References Cited

U.S. PATENT DOCUMENTS 8,533,542 B2 * 9/2013 Kang .................. H03M 13/271
714/701
2006/0282713 A1 * 12/2006 Weng ................. H03M 13/2771
714/701
(Continued)

FOREIGN PATENT DOCUMENTS

| CN | 101965703 A | 2/2011 |
|---|---|---|
| JP | 4922453 B | 2/2012 |
| WO | 2007095860 A1 | 8/2007 |

OTHER PUBLICATIONS

Ericsson. "CCE-to-RE Mapping." TSG RAN WG1 #50bis, R1-074370, Shanghai, China, Oct. 8-12, 2007, pp. 1-8.
(Continued)

*Primary Examiner* — Janice Tieu
(74) *Attorney, Agent, or Firm* — Coats & Bennett, PLLC

(57) ABSTRACT

A method and a radio base station for interleaving control channel data to be transmitted in a telecommunications system are described. The method comprises grouping the control channel elements CCE1-CCEn into a first order of control channel symbol groups, adding symbol groups comprising dummy values or zeros to the first order of control channel symbol groups based on a number of available symbol group positions for the shared control channel, interleaving the first order of the control channel symbol groups resulting in an a second order, and mapping the second order of control channel symbol groups to the available control channel transmission resources.

17 Claims, 12 Drawing Sheets

Related U.S. Application Data continuation of application No. 13/856,506, filed on Apr. 4, 2013, now Pat. No. 9,084,253, which is a continuation of application No. 12/679,419, filed as application No. PCT/SE2008/050372 on Mar. 31, 2008, now Pat. No. 8,428,164.

(60) Provisional application No. 60/974,949, filed on Sep. 25, 2007.

(51) Int. Cl.
  *H04L 1/00* (2006.01)
  *H04L 5/00* (2006.01)
  *H04L 27/26* (2006.01)

(52) U.S. Cl.
  CPC .......... *H04L 1/0072* (2013.01); *H04L 1/0079* (2013.01); *H04L 5/0007* (2013.01); *H04L 5/0044* (2013.01); *H04L 5/0048* (2013.01); *H04L 27/2637* (2013.01); *H04W 72/042* (2013.01)

(58) Field of Classification Search
  CPC ... H04L 1/0079; H04L 5/0007; H04L 5/0044; H04L 5/0048; H04L 27/2637
  See application file for complete search history.

(56) References Cited

U.S. PATENT DOCUMENTS

| | | |
|---|---|---|
| 2008/0133998 A1 | 6/2008 | Nimbalker et al. |
| 2010/0118800 A1 | 5/2010 | Kim et al. |

OTHER PUBLICATIONS

Huawei. "CCE to RE interleaver design criteria." 3GPP TSG-RAN-WG1 Meeting #49bis, R1-072904, Orlando, USA, Jun. 25-29, 2007, pp. 1-7.

Kim, S. et al. "A Method of Control Signal Transmission in Multi-Carrier Wireless Communication System." U.S. Appl. No. 60/955,869, filed Aug. 14, 2007, pp. 1-52.

Kim, S. et al., "CCE-to-RE Mapping Method," U.S. Appl. No. 60/945,111, filed Jun. 20, 2007, 1-6.

Samsung. "CCE to RE mapping." 3GPP TSG RAN WG1 #49, R1-072225, Kobe, Japan, May 7-11, 2007, pp. 1-4.

LG Electronics. "Mapping of Control Channel Elements to Resource Elements." 3GPP TSG RAN WG1 Meeting #49, R1-072345, Kobe, Japan, May 7-11, 2007, pp. 1-4.

3rd Generation Partnership Project. "3rd Generation Partnership Project; Technical Specification Group Radio Access Network; Evolved Universal Terrestrial Radio Access (E-UTRA); Multiplexing and channel coding (Release 8)." 3GPP TS 36.212, V8.0.0, Sep. 2007, Sophia Antipolis Valbonne, France, pp. 1-30.

Sun, J. et al. "Interleaver for Turbo Codes Using Permutation Polynomials Over Integer Rings." IEEE Transactions on Information Theory, vol. 51, No. 1, Jan. 2005, pp. 101-119.

LG Electronics. "Interleaver Design for CCE-to-RE mapping." 3GPP TSG RAN WG1 Meeting #50, R1-073483, Athens, Greece, Aug. 20-24, 2007, pp. 1-9.

LG Electronics. "Cell-specific Interleaving for CCE-to-RE mapping." 3GPP TSG RAN WG1 Meeting #49bis, R1-072884, Orlando, USA, Jun. 25-29, 2007, pp. 1-8.

Nortel. "The resource element mapping of the control channel elements." 3GPP TSG RAN WG1 meeting #49, R1-072382, May 7-11, 2007, Kobe, Japan, pp. 1-5.

Huawei. "CCE to RE interleaver design criteria." TSG RAN WG1 meeting #50, R1-073510, Athens, Greece, Aug. 20-24, 2007, pp. 1-7.

Huawei. "E-UTRA downlink CCE to RE mapping scheme." 3GPP TSG-RAN-WG1 Meeting #49, R1-072097, Kobe, Japan, May 7-11, 2007, pp. 1-3.

MCC Support. "Draft Report of 3GPP TSG RAN WG1 #49 v0.4.0 (Kobe, Japan, May 7-11, 2007)." 3GPP TSG RAN WG1 Meeting #49b, R1-072646, Orlando, Florida-USA, Jun. 25-29, 2007, pp. 1-56.

Nortel. "The Resource Element Mapping of PDCCH, PCFICH and PHICH." 3GPP TSG-RAN WG1 Meeting #50, R1-073290, Athens, Greece, Aug. 20-24, 2007, pp. 1-5.

* cited by examiner

| | 1 | 1 | | 1 | 1 | | 2 | 2 | | 2 | 2 | | 9 |
|---|---|---|---|---|---|---|---|---|---|---|---|---|---|
| 3 | 3 | 3 | 3 | 4 | 4 | 4 | 4 | 5 | 5 | 5 | 5 | 11 | 11 |
| 6 | 6 | 6 | 6 | 7 | 7 | 7 | 7 | 8 | 8 | 8 | 8 | 14 | 14 |

Cyclic sampling of 1 through 72 by 7

INTERFERENCE RANDOMIZATION OF CONTROL CHANNEL ELEMENTS

RELATED APPLICATIONS

This application is a continuation of U.S. application Ser. No. 14/734,518, which was filed on Jun. 9, 2015, which is a continuation of U.S. application Ser. No. 13/856,506, now U.S. Pat. No. 9,084,253, which was filed on Apr. 4, 2013, which claims the benefit of U.S. application Ser. No. 12/679,419, now U.S. Pat. No. 8,428,164, which was filed on Mar. 22, 2010, which was the National Stage of International Application No. PCT/SE2008/050372, filed Mar. 31, 2008, which claims the benefit of U.S. Provisional Application 60/974,949, filed Sep. 25, 2007, the disclosures of each of which are incorporated herein by reference in their entirety.

TECHNICAL FIELD

The present disclosure relates to a method and arrangement in a telecommunication system, in particular it relates to a method and arrangement for symbol group interleaving in a telecommunication system. The present disclosure also relates to a method for mapping symbol groups to be interleaved in a telecommunication system.

BACKGROUND

Third Generation Partnership Project (3GPP) Long Term Evolution (LTE) is the name given to a project in 3GPP to improve the UMTS mobile phone standard to future requirements. Orthogonal Frequency-Division Multiplexing (OFDM) is a digital multi-carrier modulation scheme that is used in LTE. The structure of the OFDM signal in the LTE contains resource elements spaced in time, so-called OFDM symbols, and frequency, so-called OFDM sub-carriers. These resource elements are grouped into a collection of resource blocks that make up the OFDM signal to be transmitted. Within this collection of resource blocks, certain resource elements are designated to contain the control channel signaling information, and base stations within each cell must transmit these control channel resource elements to the various mobiles i.e. mobile terminals, also called user equipment (UE) in LTE, contained within those cells. The transmissions from different cells potentially overlap in either time or frequency and may interfere with each other.

Additionally, techniques such as power control may be used for control channel signaling. This affects the level of interference that affects a mobile and it may create an uneven distribution of interference to different mobiles. If certain control channel elements from one base station is transmitted with high power, they might cause disturbance to corresponding control channel elements transmitted from another base station. One technique to overcome this uneven interference scenario is to use interference avoidance, where transmissions are coordinated between base stations, also called NodeBs or eNodeBs in LTE, so that a reduced level of interference is attained at the mobiles.

Alternatively, techniques can be used for making interference appear randomly, which results in that no mobile experiences the same interference pattern repeatedly. In the LTE system, an interference randomization technique is proposed to be used for control channel signaling.

In the suggested approach the control channel elements are interleaved and mapped to LTE transmission resource elements so that there is a randomization of interference between control channels from different cells. A control channel element (CCE) is the control channel information to one or more mobiles. A control channel element group (CCE group) is provided as a concatenation of control channel elements, possibly with a different power level set for each CCE. The CCE group is then mapped to a set of pre-defined control channel transmission resource elements and transmitted. Currently proposed approaches must have a common interleaving scheme for CCE groups transmitted from different cells followed by a cell-specific cyclic shift in order to reduce the number of information symbols transmitted from different CCEs that share common OFDM transmission resource elements, i.e. which create interference between the CCEs. This occurs prior to the mapping to transmission resource elements. The cyclic shift parameter may be tied to the cell identity (ID), for example, so the mobile can easily obtain the cyclic shift parameter. Different interleaving schemes may be used.

Consider the interleaving scheme in an LTE transmission. Let the system have a bandwidth of 5 MHz, so that 24 resource blocks are available for use (note, one resource block consists of 12 OFDM subcarriers spanning over the horizontal dimension and 7 OFDM symbols that span over the vertical dimension as illustrated by the blocks in FIGS. 1, 2, 4 and 5. Let there be two transmit antennas and one to three OFDM symbols used for the CCE group. Interleaving is done in groups of four OFDM tiles i.e. Across four adjacent or nearly adjacent resource elements in frequency, so that space-frequency block coding is permitted. Each group of four resource elements is called a symbol group. Symbol groups can alternatively be designed consisting of more or fewer resource elements.

In a configuration where the first three OFDM symbols are used for control channel signaling, there are eight symbol groups per each individual resource block and 192 symbol groups in total across the 24 resource blocks covering the 5 MHz bandwidth.

As an example, FIG. 1 shows the symbol groups (8, 9 and 10) located in one resource block 5 consisting of 12 sub carriers. Only the first three OFDM symbols 7 are shown as these three are potentially used for control channel signaling. Groups of four OFDM tiles make up symbol groups (8, 9 and 10) e.g. The tiles labeled 1 form the first symbol group. The striped and checkered tiles 6 correspond to reference tiles used, for example, for channel estimation and are not available for control or data channel transmission.

A CCE group consisting of 72 symbol groups has been considered for a 5 MHz bandwidth. This might correspond to using all the resource elements in one OFDM symbol, provided that there are no pilot tiles located in that symbol. This corresponds to FIG. 1. The performance of two symbol interleaving patterns has been considered. The patterns are a pruned bit-reversal interleave. The same interleave structure is used in all cells and interference randomization is accomplished via a cell-specific cyclic shift of the interleaved pattern prior to the mapping to resource elements.

Within one CCE group, a number of control channel elements are concatenated and transmitted. In the example illustrated in FIG. 1 consisting of 72 symbol groups, there are 9 CUES each consisting of eight symbol groups.

FIG. 2 shows the concatenation of symbols groups 22 contained within CCE1 20 through the symbol groups 23 contained within CCE9 24 in a control channel element group 21. The eight symbol groups 22 making up CCE1 20 are marked with value 1, while those making up CCE 2 25 and CCE9 24 are marked with value 2 and 9 respectively. In a different cell, if the CCE group to be transmitted has the same format, then two transmissions interfere when the symbol groups from the two CUES collide with one another. By measuring the number of collisions, it is possible to determine the collision rate performance of the various approaches. Using the interleaving and cyclic shift operations, the amount of interference (i.e. The number of collisions) is potentially reduced. This process is shown in FIG. 3, where the control channel element groups 30 first are grouped together in step 31. The control channel elements are then interleaved in step 32. In step 33 a cell-specific cyclic shift is applied to the interleaved control channel element groups.

The performance for the two interleaving patterns from R1-072225, "CCE to RE mapping", RAN1#49, Kobe, Japan, May 2007 and R1-072904, "CCE to RE interleave design criteria", RAN1#49bis, Orlando, USA, June 2007 is shown in FIG. 10. Performance is evaluated by cyclically shifting the interleaved CCE group and then finding the number of overlapping control channel elements with the same control channel element number, and is the same approach used to evaluate the results in R1-072904, "CCE to RE interleave design criteria", RAN1#49bis, Orlando, USA, June 2007. From FIG. 10, the pruned bit-reversal interleave (PBRI) pattern has high peak correlations when the CCE is shifted by a multiple of nine symbol groups, which the new pattern in R1-072904, "CCE to RE interleave design criteria", RAN1#49bis, Orlando, USA, June 2007 avoids these peaks for non-zero shifts.

Consider next a uniformly random interleaving pattern in place of either the two approaches considered in R1-072904, "CCE to RE interleave design criteria", RAN1#49bis, Orlando, USA, June 2007. This implies a random permutation of symbol groups before the cyclic shift. To get an idea of the performance under this truly random symbol permutation approach, the mean collision rate for 200 random realizations is shown in FIG. 11. Of course, not all random realization will have adequate frequency diversity, compared to the approaches used in R1-072904, "CCE to RE interleave design criteria", RAN1#49bis, Orlando, USA, June 2007. While randomization of the interfering CCE groups reduces interference consistently, a truly random symbol permutation is not practical due to the required signaling aspects between the base station and the mobile for such a scheme.

The difficulty in using the approaches considered in R1-072904, "CCE to RE interleave design criteria", RAN1#49bis, Orlando, USA, June 2007 is that they are defined for a specific number of symbol groups mapped to the CCE size and/or the CCE group size. When also accounting for frequency diversity, these approaches are also defined for specific frequency bandwidths. When these parameters change, the interleaving patterns are either no longer valid or may not satisfy the design requirements, i.e. they are not flexible to changing CCE or CCE group sizes, or bandwidth or OFDM symbol allocations in the control channel transmission resources. Consequently, a more flexible approach whose performance approaches the performance of the random realization scheme shown previously is preferred.

SUMMARY

The present disclosure aims at providing a solution that alleviates at least one of the problems indicated above.

The present disclosure intends to provide a common approach for symbol group permutation, i.e. symbol group interleaving, that accomplishes at least one of the following objectives:

providing a different symbol group interleaving pattern to be used in different cells;

flexibility in that it can handle a different frequency bandwidth in the control channel transmission resources, a different number of OFDM symbols in the control channel transmission resources, and a different number of symbol groups in the information stream;

providing interference randomization performance comparable to that of the random interleave discussed above in the average sense; and providing frequency diversity as well as interference randomization.

A solution according to the present disclosure for accomplishing the above objectives is to use a flexible symbol group interleave that can handle control channel parameters that may not be fixed in time or in the cellular system. These parameters include: the number of OFDM sub-carriers in the control channel transmission resources; the number of OFDM symbols in the control channel transmission resources; the number of symbol groups in the control channel signal; and the number of available symbols groups in the control channel transmission resources for placing the control channel symbol groups. Combined with an optional cell-specific cyclic shift, this allows for interference randomization. Further, by regrouping symbol groups by resource block order in the control channel transmission resources and designing the symbol group permutation pattern taking the resource block size into account, frequency diversity can be provided. An additional aspect of this approach is that interference can be further reduced by advantageously locating the control channel symbol groups within the available OFDM symbols in the control channel transmission resources in case there is a greater number of potential symbol groups available in the control channel transmission resources than are required within the control channel information stream.

At least one of the above objects is achieved with a method or arrangement according to the appended independent claims. Further objects and advantages are evident from the dependent claims.

A first aspect of the present disclosure relates to a method for randomization of interference experienced by a shared control channel transmitted by using control channel transmission resources from a base station. The shared control channel comprises control channel elements CCE1-CCEn. The control channel elements CCE1-CCEn are grouped into a first order of control channel symbol groups. Symbol groups comprising dummy values or zeros are added to the first order of control channel symbol groups based on a number of available symbol group positions for the shared channel. The first order of the control channel symbol groups are interleaved, resulting in a second order for the control channel symbol groups. The second order of control channel symbol groups is mapped to the available control channel transmission symbol group positions.

A second aspect of the present disclosure relates to a radio base station configured to randomization of interference experienced by a shared control channel, where the shared control channel is transmitted by using control channel transmission resources from the base station. The shared control channel comprises control channel elements CCE1-CCEn and the base station comprises a processing circuit for grouping the control channel elements CCE1-CCEn into a first order of control channel symbol groups. A processing circuit is also provided for adding symbol groups comprising dummy values or zeros to the first order of control channel symbol groups based on a number of available symbol group positions for the shared channel. Further, a processing circuit interleaves the first order of the control channel symbol groups resulting in a second order for the control channel symbol groups. The radio base station also has a processing circuit for mapping the second order of control channel symbol groups to the available control channel transmission symbol group positions.

The described aspects and embodiments of the present disclosure provide the advantage of renumbering of the symbol groups so that frequency diversity can easily be accounted for in the interleave design.

Another advantage is that all available symbol groups are used, not only those contained in the control channel information.

Yet another advantage is enhanced performance due to better mapping or placing of the used symbol groups from a larger subset of symbols groups.

A further advantage is flexibility with respect to the frequency bandwidth, number of OFDM symbols, and number of information symbol groups used for control channel signaling.

In the following, preferred embodiments of the present disclosure will be described with reference to the enclosed drawings.

BRIEF DESCRIPTION OF THE DRAWINGS

FIG. 5 illustrates symbol groups defined over three OFDM symbols.

DETAILED DESCRIPTION

Figure 1:
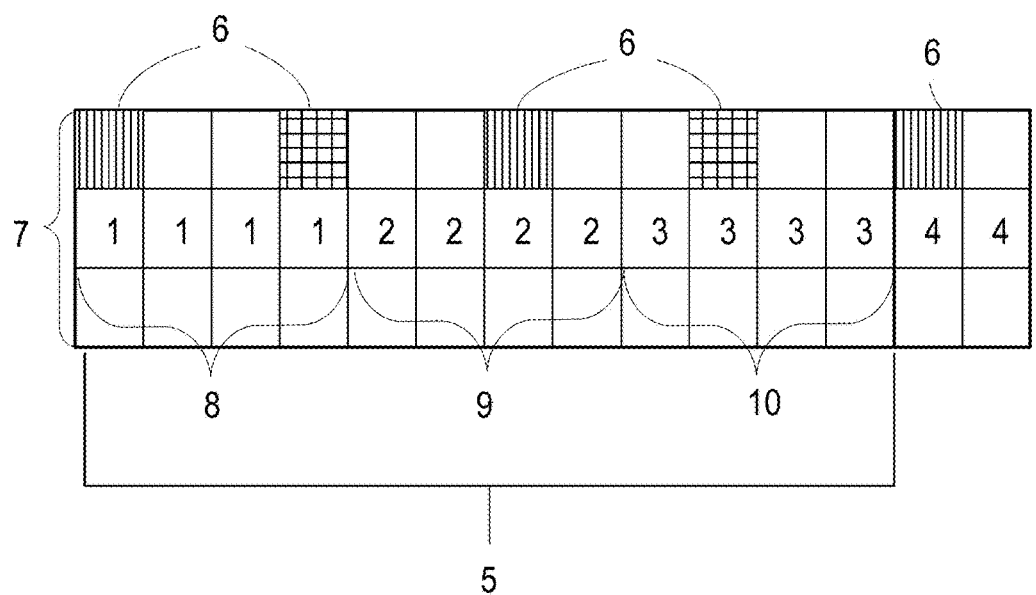
FIG. 1 schematically illustrates symbol groups defined over one OFDM symbol according to prior art.
Figure 2:
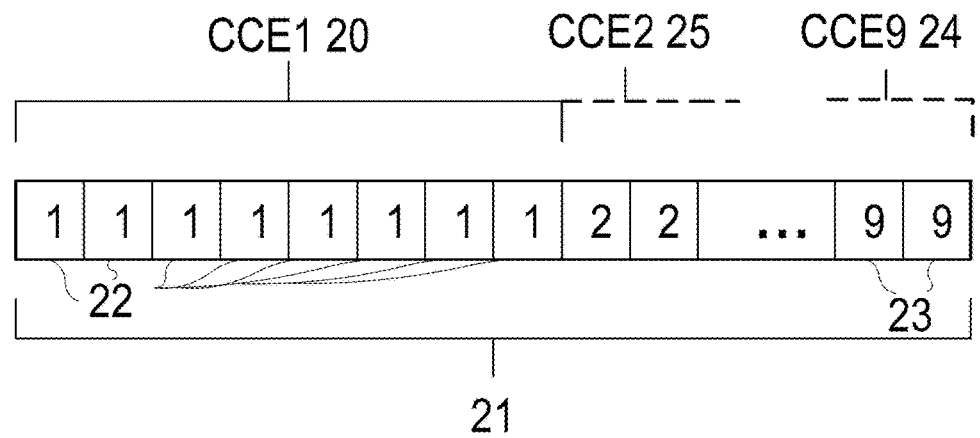
FIG. 2 in turn schematically illustrates a control channel element group using 72 symbol groups according to prior art.
Figure 3:
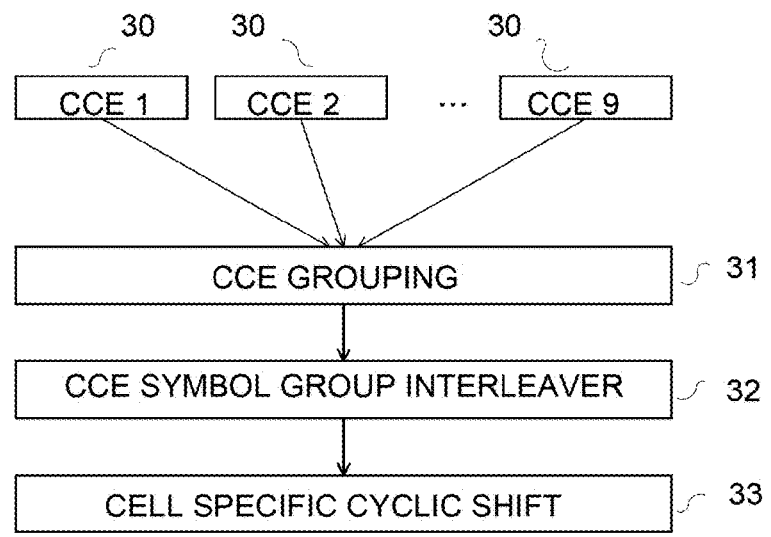
FIG. 3 illustrates an example of prior art CCE group interleaving with cyclic shift.
Figure 4:
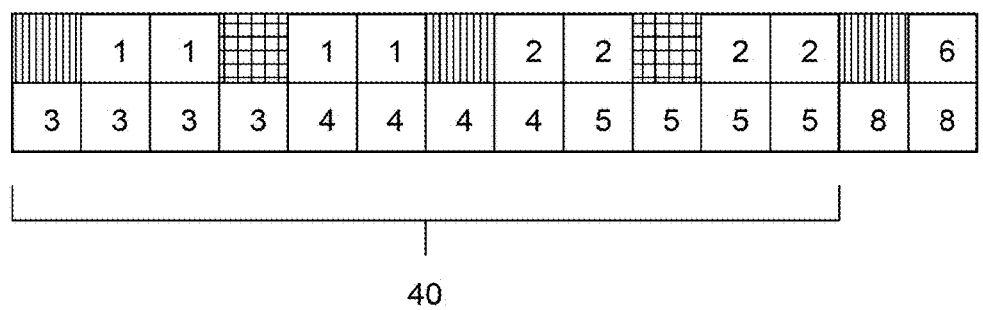
FIG. 4 illustrates symbol groups defined over two OFDM symbols.

In the following, various embodiments of the present disclosure will be described. The approach described below is intended for flexibility with performance approaching that of the random interleaving approach described above. Considering the 72 symbol group example discussed above, where the cell-specific cyclic shift is intended to randomize interference between cells. However, when changing CCE or CCE group sizes, or bandwidth or OFDM symbol allocations in the control channel transmission resources, it becomes difficult to design an interleaving pattern to handle this variability. Consider the case of having 72 symbol groups within a CCE transmitted within a 5 MHz bandwidth. There are only 48 sub-carriers available in the first OFDM symbol, therefore either two or three OFDM symbols must be used to transmit the entire CCE. FIG. 4 shows the two-symbol structure with resource block 40 while FIG. 5 shows the three symbol structure of the control channel transmission resources with resource block 50. One new aspect according to the present disclosure shown in FIGS. 4 and 5 is that the symbol groups are numbered sequentially within a resource block 40 (FIG. 4) and 50 (FIG. 5) rather than across OFDM sub-carriers. When combined with symbol group interleaving, the numerical distance between symbol groups now can be used as a measure of frequency diversity. For example, using the two OFDM symbols as in FIG. 4, when the distance between two symbol groups is greater than 5, then these two symbol groups reside in different resource blocks. A distance of 8 symbol groups would imply the same for the control channel configuration shown in FIG. 5.

Figure 14:
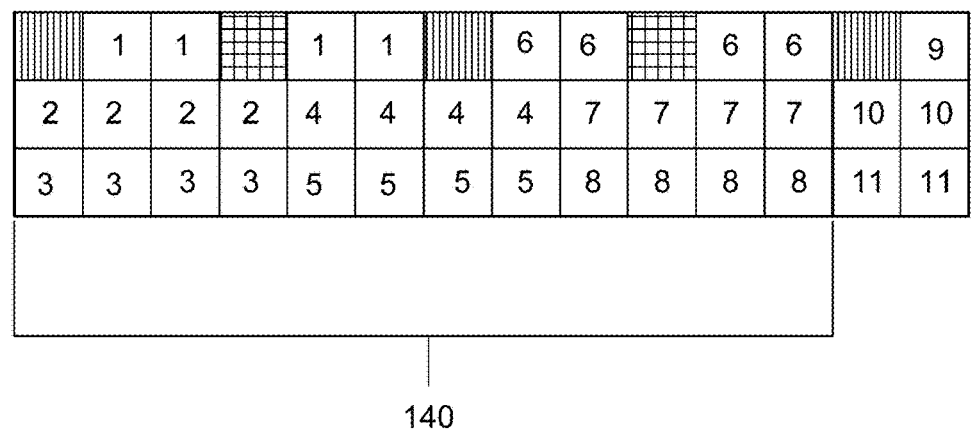
FIG. 14 illustrates symbol groups defined over three OFDM symbols and ordered by OFDM symbol within a resource block.

It should be clear to those skilled in the art that the numbering methodology taught herein is to ensure the numbering provides a good representation of frequency separation. Hence, numbering methods according to the present disclosure are not limited to those shown in FIG. 4 and FIG. 5. The sequential numbering can be mapping sequentially over OFDM symbols within the symbol group positions followed by mapping sequentially over frequencies within said symbol group positions, as shown in FIG. 14. In FIG. 14 reference number 140 denotes a resource block. Therefore, a distance of 8 symbol groups results in that symbol groups reside in different resource blocks.

A second aspect of the present disclosure is that while there are 72 symbol groups contained within the control channel information, there are 120 available symbol group positions in the control channel transmission resources within the first two OFDM symbols where the CCE may be inserted (192 in the first three OFDM symbols). This can advantageously be used to further randomize interference and results in even less interference between control channels from different cells.

However, note that not all symbol group positions may be available for potential randomization purposes. In fact, some of the symbol group positions may be fixed for other fields, such as the Physical Hybrid-ARQ Indicator Channel (PHICH) and Physical Control Format Indicator Channel (PCFICH) portions of the control channel. This implies that fewer than 120 symbol groups will be available when using two OFDM symbols (or 192 when using three OFDM symbols). For example, if 4 symbol groups are dedicated to the PCFICH field and 3 symbol groups dedicated to the PHICH field, then there are 113 symbol groups available for interference randomization. This demonstrates why flexibility is important in designing the interleave design.

Next, consider the 72 symbol group CCE to be transmitted in the 113 possible symbol groups available over the 5 MHz bandwidth control channel transmission resources in the first two OFDM symbols. A similar approach of interleaving plus cyclic shifting can be used for interference randomization. However, now let the symbol groups in the control channel information be ordered from 1 to 113 using the resource block order described in this section, where the last 41 symbol groups consist of "dummy values" or zeros, i.e. groups that are not transmitted after symbol permutation and cyclic shifting. This not only randomizes the positions of the resulting symbol groups, but also avoids interference from some symbol groups in the control channel transmission resources from other cells that do not occupy the same channel transmission resource elements. One aspect of this approach is that the previously considered interleave designs are no longer applicable in this new format, since the interleave (i.e. The symbol group permutation) must work with a length of 113 in this example, and this number may change depending on the number of OFDM symbols used for control channel signaling or the number of PHICH and PCFICH symbol groups to be transmitted. Below we consider two embodiments of the present disclosure that incorporate the above two aspects together with flexible interleave designs that randomize interference.

Figure 6:
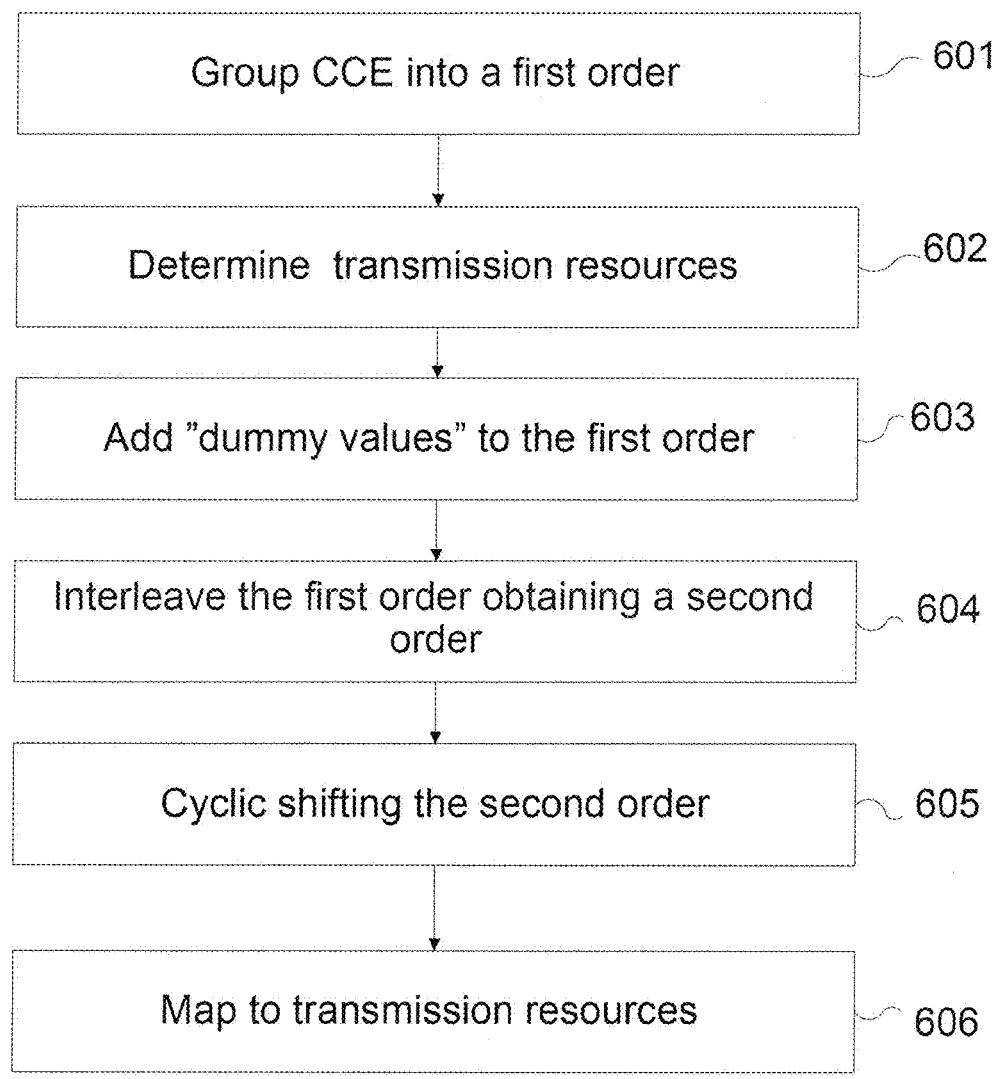
FIG. 6 shows a first embodiment of the present disclosure.

A first embodiment is shown in FIG. 6, by illustrated flowchart. In the method, control channel elements CCE1-CCEn are grouped into a first order of control channel symbol groups in step 601. In the next step 602 a number of available symbol group positions of control channel transmission resources are determined. The number of available symbol group positions in step 602 may e.g. be based on a number of OFDM symbols and OFDM sub carriers used for the control channel transmission resources. Based on the number of symbol groups that are available in the control channel transmission resources, symbol groups comprising "dummy" values or zeros are added in step 603 to the first order of control channel symbol groups so that the first order of symbol groups substantially equals the number of available symbol group positions in the control channel transmission resources. The first order of the control channel symbol groups are then interleaved in step 604 resulting in a second order for the control channel symbol groups. A cyclic shifting of the second order is then followed in step 605 before the cyclic shifted second order of control channel symbol groups are mapped to the control channel transmission symbol group positions in step 606. The cell-specific cyclic shift in step 605 may for example be determined based on the cell ID. The mapping of control channel symbol groups in step 606 may first be done sequentially over frequencies within the symbol group positions followed by a sequentially mapping over OFDM symbols within the symbol group positions or the other way around, which means that the mapping in step 606 first is done sequentially over OFDM symbols within the symbol group positions followed by a sequentially mapping over frequencies within the symbol group positions.

Alternatively the mapping in step 606 may be done sequentially with respect to symbol groups within resource blocks of said control channel transmission resources. The mapping can then first be done sequentially over frequencies within the resource block followed by a sequentially mapping over OFDM symbols within the resource block, or the other way around, which means that the mapping in step 606 first is done sequentially over OFDM symbols within the resource block followed by a sequentially mapping over frequencies within said resource block.

To achieve flexibility, the Quadratic Permutation Polynomials (QPP) based interleave design may be used for interleaving in step 604, as it can handle a varying length of symbol groups. Interleavers based on the quadratic permutation polynomials were proposed and designed to be used in a turbo code J. Sun and O. Y. Takeshita, "Interleavers for turbo codes using permutation polynomials over integer rings," IEEE Trans. Inform. Theory, vol. 51, no. 1, pp. 101-119, January 2005. For instance is a table of all 188 different QPP interleave parameter sets defined for LTE turbo code 3G Partnership Program in Technical Specifications 36.212 v8, "Multiplexing and Channel Coding (Release 8)," 2007.

Each QPP interleave is defined by three parameters: length K and the polynomial coefficients $f_1$ and $f_2$. The relationship between the output index i and the input index $\Pi(i)$ satisfies the following quadratic form:

$$\Pi(i) = (f_1 \times i + f_2 \times i^2) \bmod K$$

For instance, the interleaving addresses or address values for K=40 (and $f_1$=3, $f_2$=10) are 0 13 6 19 12 25 18 31 24 37 30 3 36 9 2 15 8 21 14 27 20 33 26 39 32 5 38 11 4 17 10 23 16 29 22 35 28 1 34 7

Figure 7:
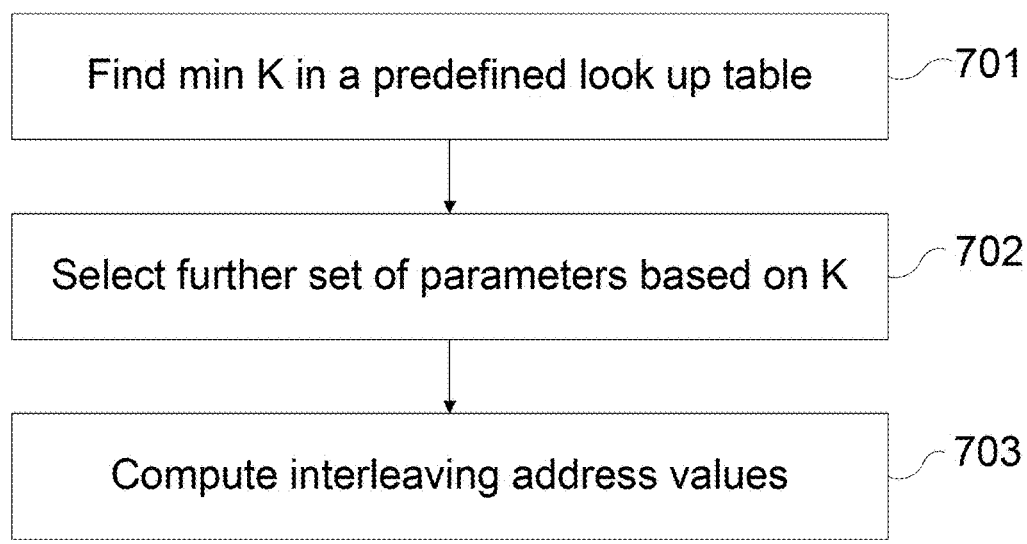
FIG. 7 illustrates a second embodiment of the present disclosure using a QPP symbol group interleave.

According to another embodiment of the present disclosure the step 604 of interleaving, in the method according to FIG. 6, may further comprise the steps as illustrated in FIG. 7.

Let $N_{SG}$ represent the number of available symbol group positions in the control channel transmission resources determined in step 602 of FIG. 6. Find in step 701 (FIG. 7) the minimum value of parameter K in a predefined look up table e.g. in Table 1 such that $K \geq N_{SG}$ and select in step 702 a further set of parameters ($f_1, f_2$, i) based on the value K in the look-up table. Compute the interleaving addresses of the selected QPP interleave in step 703. If $K > N_{SG}$, the out-of-bound addresses (i.e., those higher than $N_{SG}-1$) are truncated.

For instance, if $N_{SG}$=35, then the QPP with K=40 (and $f_1$=3, $f_2$=10) will be selected. After truncation, the interleaving addresses for the padded CCE group are 0 13 6 19 12 25 18 31 24 30 3 9 2 15 8 21 14 27 20 33 26 32 5 11 4 17 10 23 16 29 22 28 1 34 7

According to another embodiment of the present disclosure yet another interleaving approach may be used in step 604.

Figure 8:
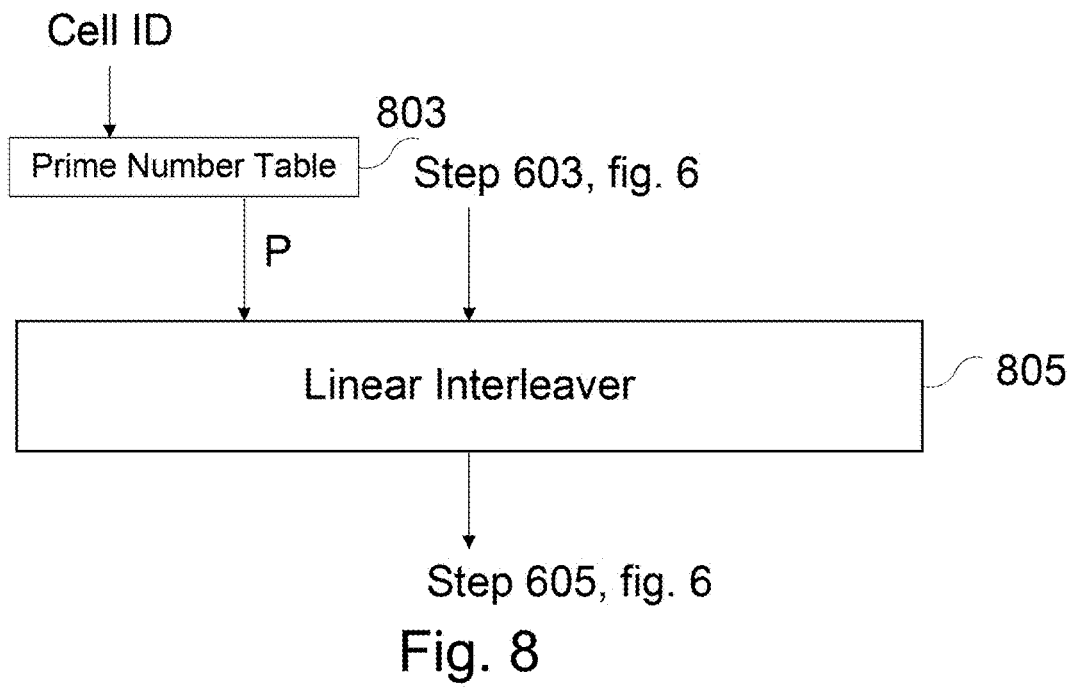
FIG. 8 illustrates a second preferred embodiment of the present disclosure with cell specific interleave.

This different approach is shown in FIG. 8. Rather than to use the same interleave, i.e. symbol group permutation, in each cell, a cell-specific interleave is used in step 805. Note, in the method according to FIG. 7 a different interleave would be used when there are a different number of available symbol groups present in the control channel transmission resources in each cell. However, in the case when the number of available symbol groups in the control channel transmission resources is the same in each cell the method in FIG. 8 explicitly uses a different interleave design in step 805 to further randomize interference. In the approach according to FIG. 8, the interleave design in step 805 is a linear interleave using a specific prime number P. The value of P is cell-specific and may, for example, be chosen based on a prime-number lookup table 803 based on the cell identity. The method according to FIG. 8 is described in more detail below.

Figure 9:
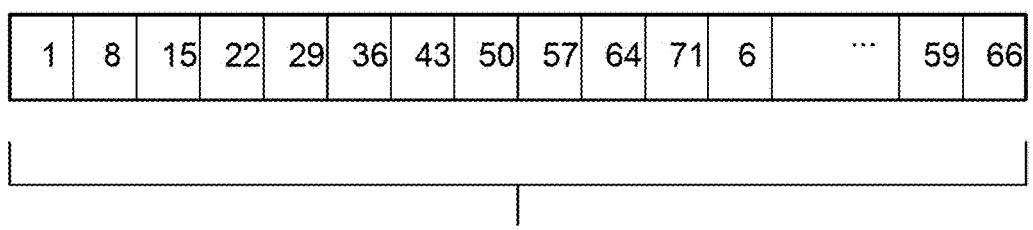
FIG. 9 illustrates an example of cyclic sampling for 72 symbol groups.
Figure 10:
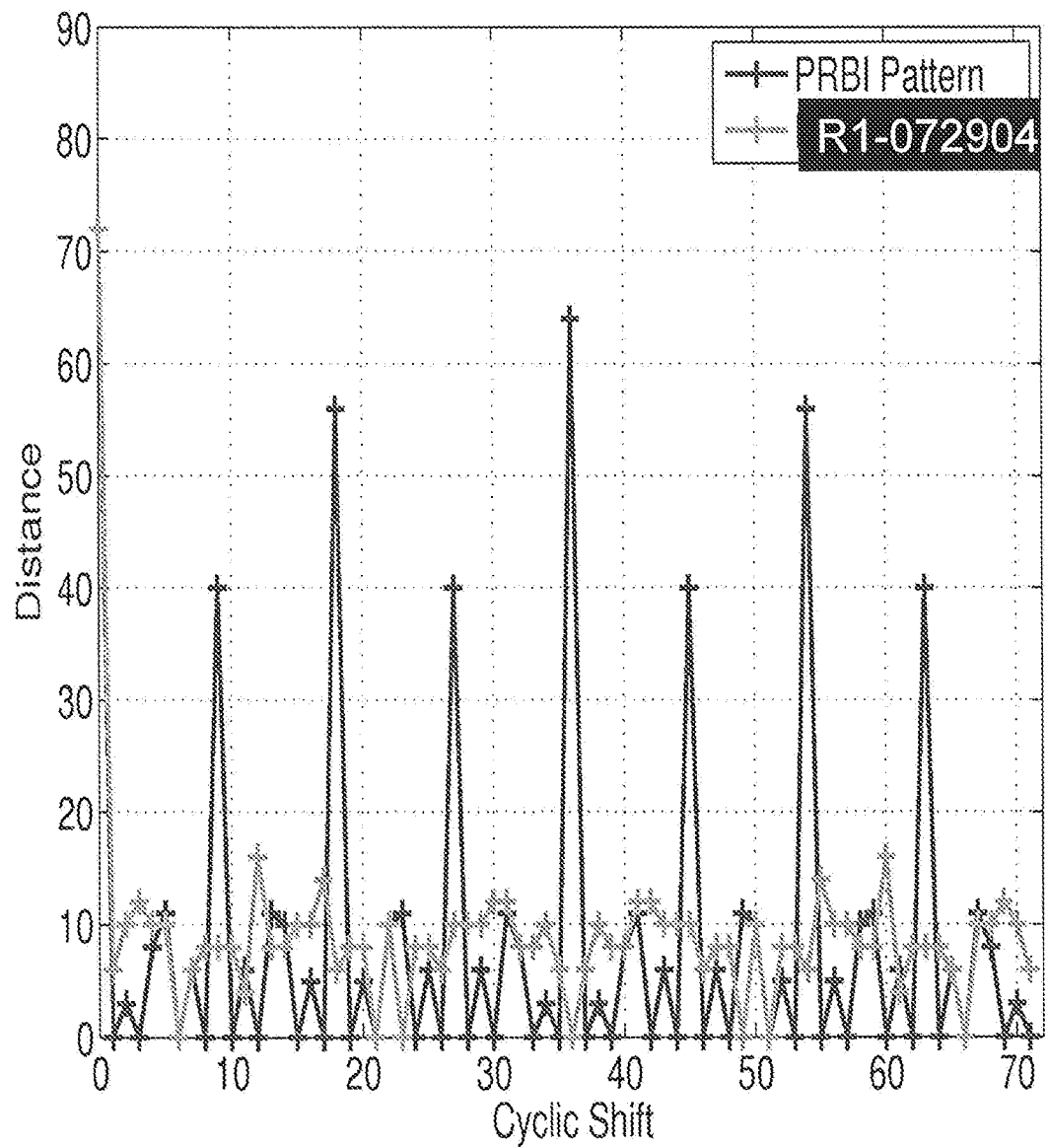
FIG. 10 shows symbol group collision rate for interleaving approaches according to prior art in R1-072904, "CCE to RE interleave design criteria," Huawei, RAN1#49bis, Orlando, USA, June 2007.
Figure 11:
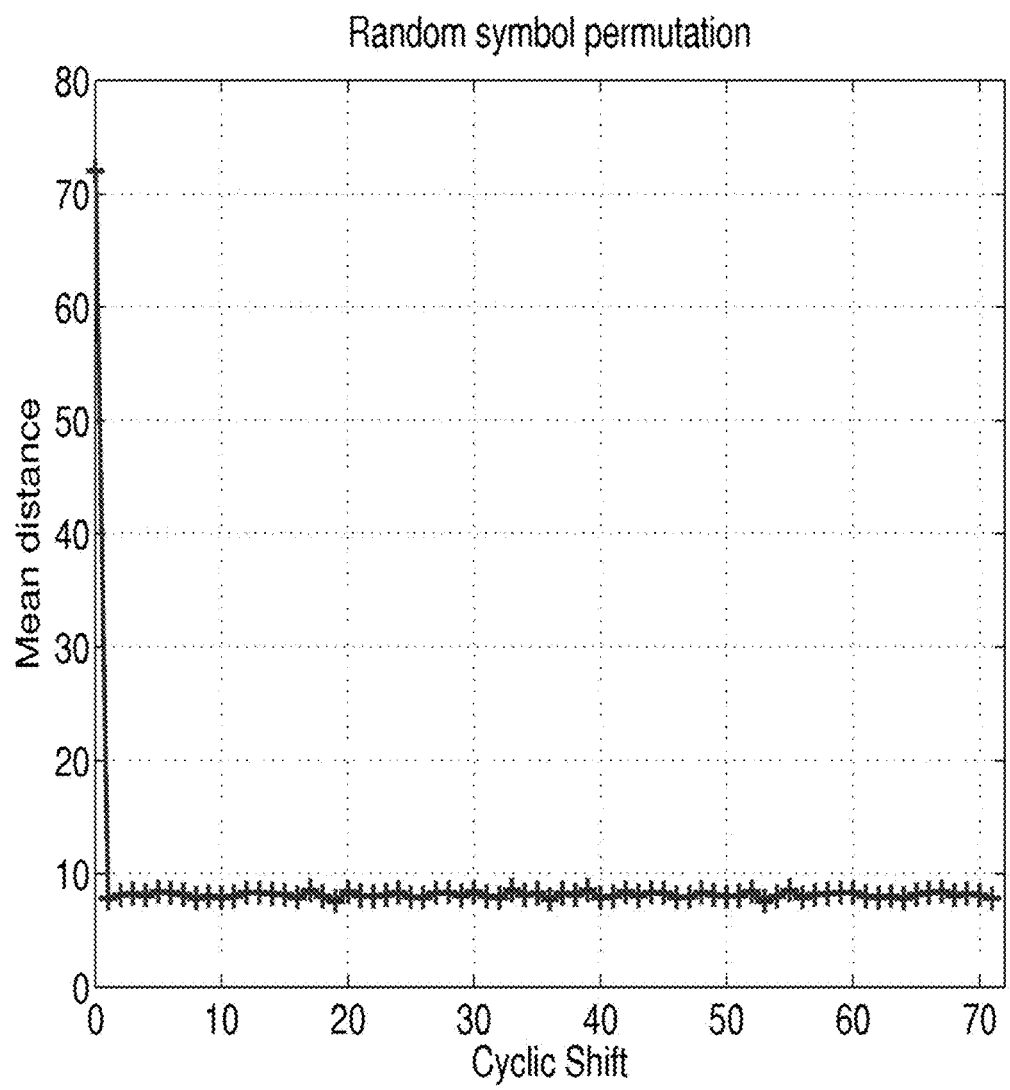
FIG. 11 illustrates symbol group mean collision rate for random interleavers.
Figure 12:
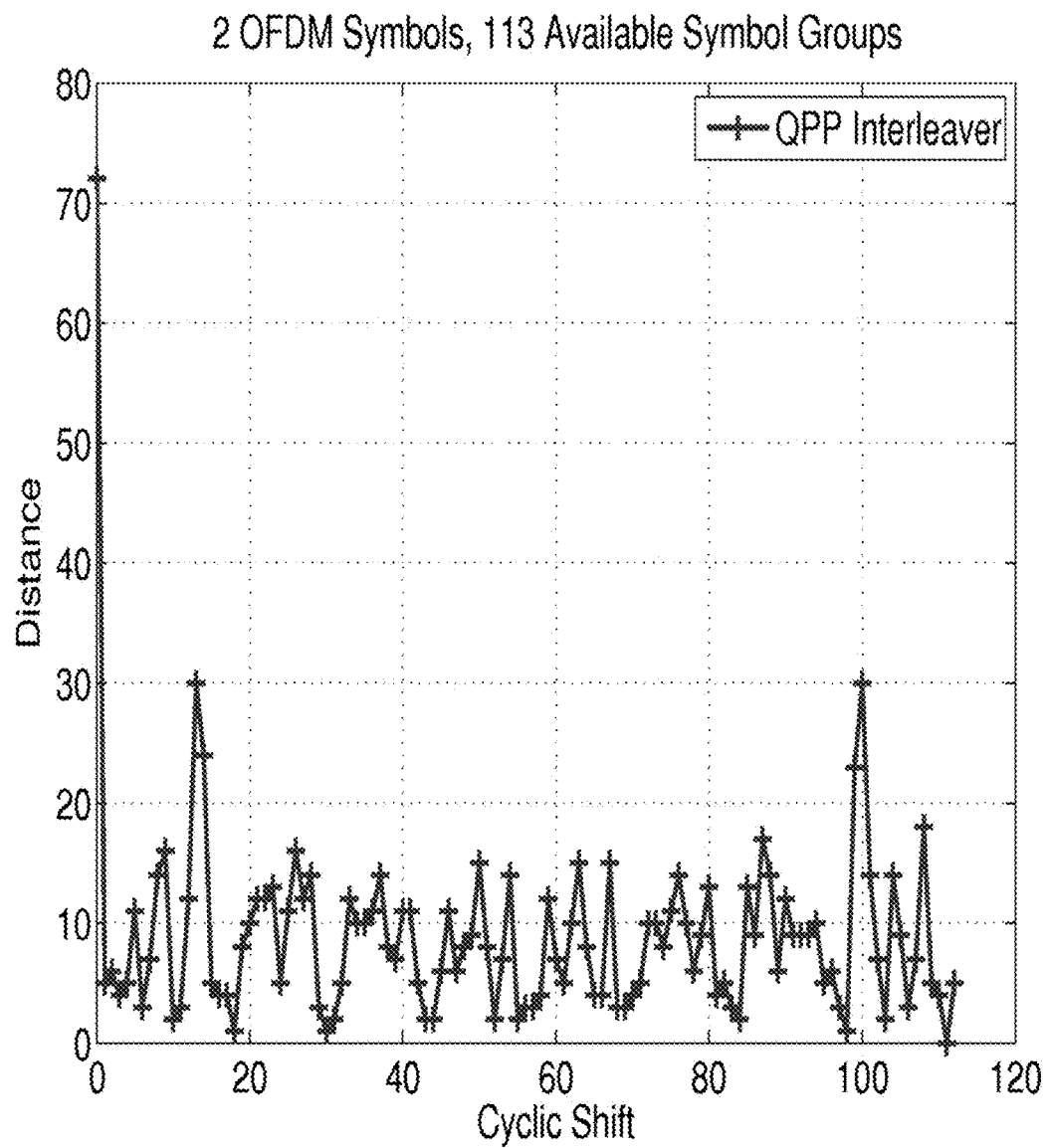
FIG. 12 illustrates collision rate for embodiment 1 of the present disclosure using QPP interleave.
Figure 13:
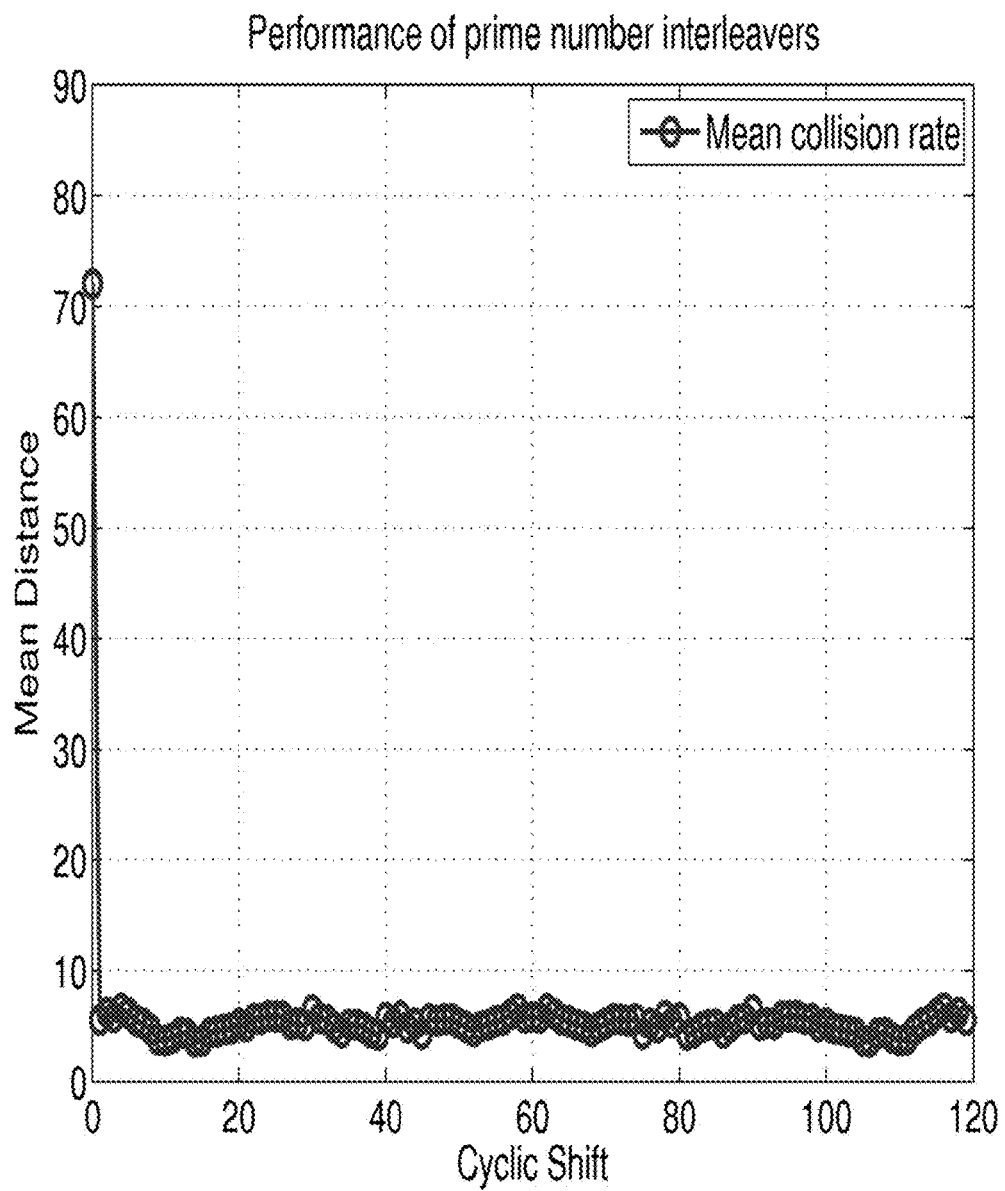
FIG. 13 shows mean collision rate for embodiment 2 of the present disclosure across different prime number interleavers.

Consider a permutation pattern for the numbers in natural order 1 through 72 that represents the 72 symbol groups in the control channel signal. In step 805 let the permutation be a cyclic sampling of these numbers by a prime number P that is not a factor of 72. For example, consider the cyclic sampling of the numbers 1 through 72 by a sample spacing of P=7, starting with the number 1. The result is a sequence of the original numbers 1 through 72 now arranged according to FIG. 9. To ensure that the interleave is cell specific, let both the sample spacing in step 805 of the symbol groups and the chosen cyclic shift be determined by the cell ID. In order to accommodate many cell specific symbol group permutation patterns, a procedure for selecting the allowable sample spacing values is defined in step 805. Let the ordered set of prime numbers from one to some large N (with some restrictions described below) be used as these values. Let P be the cyclic sample spacing and $N_{SG}$ be the number of symbol group positions in the control channel transmission resources, the restrictions on choosing prime numbers can be set as follows:

Disallow a value P that is a factor of $N_{SG}$;

To enable frequency diversity, only allow values of P that fall in the range $\delta \leq \mod(P-1, N_{SG})+1 \leq N_{SG}-\delta$ where $\delta$ is some integer greater than 2. For example, setting $\delta=8$ for the approach shown in FIG. 5 places adjacent symbol groups in different resource blocks. The performance of this approach is shown in FIG. 13, comparing the collisions between different cells with different values of P. Note, since 120 available symbols in the control channel transmission resources are assumed in this example, the mean collision rate is lower because of the use of the zero-padded, dummy symbol groups.

Some considerations for the above described preferred embodiments are: The cell-specific cyclic shift operations may be performed prior to the interleaving function i.e. their order may be swapped. In the method according to FIG. 6 step 605 may thus be performed before step 604. The null symbol groups or symbol groups comprising "dummy" values may be combined with the used symbol groups in other ways than appending the null symbol groups. They may rather be pre-pended, for example, or otherwise combined with the used symbol groups. Instead of "dummy values" other data than control channel data can be put in the symbol groups that are not used for control channel data. Other data than control channel data can also be mixed with "dummy values" and/or zeros and put in the symbol groups that are not used for control channel data.

The above described methods may be applied in radio base stations supporting e.g. LTE.

Figure 15:
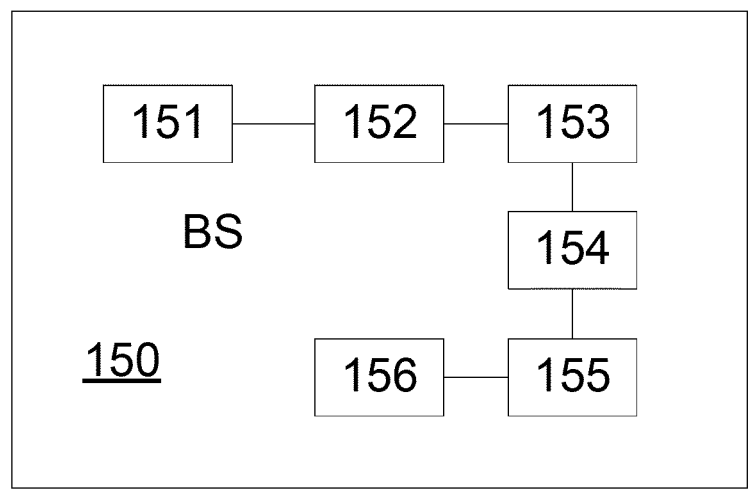
FIG. 15 schematically illustrates a base station according to an embodiment of the present disclosure.

Turning now to FIG. 15 illustrating schematically a radio base station according to embodiments of the present disclosure. The radio base station 150 comprises means 151 for grouping control channel elements CCE1-CCEn into a first order of control channel symbol groups. The radio base station comprises further means 152 for determining a number of available symbol group positions of control channel transmission resources. Means 153 are also provided for adding symbol groups comprising "dummy" values or zeros to the first order of control channel symbol groups so that the first order of symbol groups substantially equals the number of available symbol group positions in control channel transmission resources. The base station comprises further means 154 for interleaving the first order of the control channel symbol groups resulting in a second order for the control channel symbol groups. Means 155 are also provided for cyclic shifting the second order and there are further means 156 for mapping the cyclic shifted second order of control channel symbol groups to the control channel transmission symbol group positions.

The approaches for interference randomization that are disclosed have the flexibility with respect to the frequency bandwidth, number of OFDM symbols, and number of information symbol groups used for control channel signaling. The approach can, of course, be applied to other situations where interference randomization is required. Any examples and terminology relating to 3GPP LTE standard being used herein should not be seen as limiting the scope of the present disclosure, the methodology of which in principle can be applied to any communication system using symbol interleaving. Means mentioned in the present description can be software means, hardware means or a combination of both. The described subject matter is of course not limited to the above described and in the drawings shown embodiments, but can be modified within the scope of the enclosed claims.

What is claimed is:

1. A method for randomization of interference experienced by a shared control channel transmitted from a radio base station using control channel transmission resources, wherein said shared control channel comprises control channel elements, CCE1-CCEn, said method comprising:
grouping the control channel elements, CCE1-CCEn, into a first order of symbol groups;
adding symbol groups comprising dummy values or zeros to the first order of symbol groups based on a number of available symbol group positions;
permuting the symbol groups in the first order, resulting in a second order of said symbol groups;
cyclically shifting said second order or cyclically shifting the first order prior to permuting; and
mapping the second order of symbol groups, which has been cyclically shifted, to said available symbol group positions of the control channel transmission resources.

2. The method according to claim 1, wherein the cyclic shifting is cell-specific and based on cell identity.

3. The method according to claim 1, wherein transmission resources comprise a number of Orthogonal Frequency-Division Multiplexing, OFDM, symbols and OFDM subcarriers and wherein a number of available symbol group positions of said control channel transmission resources are determined based on a number of OFDM symbols and OFDM subcarriers used for the control channel transmission.

4. The method according to claim 1, wherein the mapping comprises mapping sequentially over frequencies within said symbol group positions followed by mapping sequentially over OFDM symbols within said symbol group positions.

5. The method according to claim 1, wherein the mapping comprises mapping sequentially over OFDM symbols within said symbol group positions followed by mapping sequentially over frequencies within said symbol group positions.

6. The method according to claim 1, wherein the mapping comprises mapping sequentially with respect to symbol groups within resource blocks of said control channel transmission resources.

7. The method according to claim 6, wherein the mapping comprises mapping sequentially over frequencies within said resource block followed by mapping sequentially over OFDM symbols within said resource block.

8. The method according to claim 6, wherein the mapping comprises mapping sequentially over OFDM symbols within said resource block followed by mapping sequentially over frequencies within said resource block.

9. The method according to claim 1, wherein the permuting is performed using Quadratic Permutation Polynomials, QPP, based interleaving.

10. The method according to claim 9, wherein said QPP based interleaving comprises:
establishing the minimum value of a parameter K in a predefined look-up table such that $K \geq N_{SG}$, where $N_{SG}$ is the number of available symbol group positions of said control channel transmission resources;

selecting a further set of parameters ($f_1$, $f_2$, i) based on said value K in said look-up table; and computing interleaving address values of the thus selected QPP interleaver by applying said parameter values (K, $f_1$, $f_2$, i) in formula:

$$\Pi(i)=(f_1 \times i + f_2 \times i^2) \bmod K$$

where
K=length,
$f_1$ and $f_2$=polynomial coefficients,
i=index of output symbol group,
$\Pi(i)$=index of input symbol group.

11. The method according to claim 10, wherein the computing further comprises, if $K>N_{SG}$, discarding any resulting interleaving address values higher than $N_{SG}-1$.

12. The method according to claim 1, wherein the permutation is cell-specific linear interleaving.

13. The method according to claim 12, wherein the cell-specific linear interleaving is computed with a cell-specific prime number P.

14. The method according to claim 13, wherein the cell-specific prime number P chosen is limited to prime numbers that provide sufficient frequency diversity, as determined by a numerical distance value between symbol groups that is above a certain threshold value.

15. The method according to claim 1, further comprising, prior to the adding, determining a number of available symbol group positions of said control channel transmission resources.

16. The method according to claim 1, wherein the adding comprises appending or prepending or otherwise combining symbol groups comprising dummy values or zeros to said first order of symbol groups.

17. A radio base station configured for randomization of interference experienced by a shared control channel transmitted from said radio base station using control channel transmission resources, wherein said shared control channel comprises control channel elements, CCE1-CCEn, and where the radio base station comprises:
    a first processing circuit configured to group the control channel elements CCE1-CCEn into a first order of symbol groups;
    a second processing circuit configured to add symbol groups comprising dummy values or zeros to the first order of symbol groups based on a number of available symbol group positions;
    a third processing circuit configured to permute symbol groups in the first order, resulting in an a second order of said symbol groups;
    a fourth processing circuit configured to cyclic shifting of said second order or for cyclic shifting of the first order prior to permuting; and
    a fifth processing circuit configured to map the second order of symbol groups, which has been cyclically shifted, to said available symbol group positions of the control channel transmission resources.

* * * * *

UNITED STATES PATENT AND TRADEMARK OFFICE
CERTIFICATE OF CORRECTION

PATENT NO. : 9,961,674 B2
APPLICATION NO. : 15/204339
DATED : May 1, 2018
INVENTOR(S) : Molnar et al.

Page 1 of 3

It is certified that error appears in the above-identified patent and that said Letters Patent is hereby corrected as shown below:

In the Specification

In Column 1, Line 7, delete "2015," and insert -- 2015, now U.S. Pat. No. 9,397,874, --, therefor.

In Column 2, Line 26, delete "i.e. Across" and insert -- i.e. across --, therefor.

In Column 2, Lines 38-39, delete "sub carriers." and insert -- subcarriers. --, therefor.

In Column 2, Line 42, delete "e.g. The" and insert -- e.g. the --, therefor.

In Column 2, Line 52, delete "interleave. The same interleave" and insert -- interleaver. The same interleaver --, therefor.

In Column 2, Line 59, delete "CUES" and insert -- CCEs --, therefor.

In Column 2, Line 64, delete "CCE 2" and insert -- CCE2 --, therefor.

In Column 3, Line 1, delete "CUES" and insert -- CCEs --, therefor.

In Column 3, Line 5, delete "(i.e. The" and insert -- (i.e. the --, therefor.

In Column 3, Line 14, delete "interleave" and insert -- interleaver --, therefor.

In Column 3, Line 21, delete "interleave" and insert -- interleaver --, therefor.

In Column 3, Line 23, delete "interleave" and insert -- interleaver --, therefor.

In Column 3, Line 25, delete "interleave" and insert -- interleaver --, therefor.

Signed and Sealed this
Thirty-first Day of July, 2018

Andrei Iancu
*Director of the United States Patent and Trademark Office*

In Column 3, Line 30, delete "interleave" and insert -- interleaver --, therefor.

In Column 3, Line 38, delete "interleave" and insert -- interleaver --, therefor.

In Column 3, Line 45, delete "interleave" and insert -- interleaver --, therefor.

In Column 4, Line 9, delete "interleave" and insert -- interleaver --, therefor.

In Column 4, Line 15, delete "interleave" and insert -- interleaver --, therefor.

In Column 5, Line 11, delete "interleave" and insert -- interleaver --, therefor.

In Column 5, Line 41, delete "interleave." and insert -- interleaver. --, therefor.

In Column 5, Line 43, delete "interleave." and insert -- interleaver. --, therefor.

In Column 5, Line 48, delete "interleave" and insert -- interleaver --, therefor.

In Column 5, Line 53, delete "interleave." and insert -- interleaver. --, therefor.

In Column 6, Line 61, delete "interleave" and insert -- interleaver --, therefor.

In Column 7, Line 10, delete "interleave" and insert -- interleaver --, therefor.

In Column 7, Line 12, delete "interleave (i.e. The" and insert -- interleaver (i.e. the --, therefor.

In Column 7, Lines 18-19, delete "interleave" and insert -- interleaver --, therefor.

In Column 7, Line 27, delete "sub carriers" and insert -- subcarriers --, therefor.

In Column 7, Line 63, delete "interleave" and insert -- interleaver --, therefor.

In Column 8, Line 4, delete "interleave" and insert -- interleaver --, therefor.

In Column 8, Line 8, delete "interleave" and insert -- interleaver --, therefor.

In Column 8, Line 29, delete "interleave" and insert -- interleaver --, therefor.

In Column 8, Line 41, delete "interleave," and insert -- interleaver, --, therefor.

In Column 8, Line 42, delete "interleave" and insert -- interleaver --, therefor.

In Column 8, Line 43, delete "interleave" and insert -- interleaver --, therefor.

In Column 8, Line 49, delete "interleave" and insert -- interleaver --, therefor.

CERTIFICATE OF CORRECTION (continued)
U.S. Pat. No. 9,961,674 B2

In Column 8, Line 51, delete "interleave" and insert -- interleaver --, therefor.

In Column 8, Line 52, delete "interleave" and insert -- interleaver --, therefor.

In Column 8, Line 65, delete "interleave" and insert -- interleaver --, therefor.

In the Claims

In Column 12, Line 20, in Claim 17, delete "an a" and insert -- a --, therefor.